_United States Patent Office_

3,489,816
Patented Jan. 13, 1970

3,489,816
PROCESS FOR PREPARING ALLYL CHLORIDE AND ITS MONOMETHYL-SUBSTITUTION PRODUCTS
Lothar Hornig, Frankfurt am Main, Lothar Hirsch, Kelkheim, Taunus, and Gunther Mau and Therese Quadflieg, Frankfurt am Main, Germany, assignors to Farbwerke Hoechst Aktiengesellschaft vormals Meister Lucius & Bruning, Frankfurt am Main, Germany, a corporation of Germany
No Drawing. Filed June 1, 1965, Ser. No. 460,543
Claims priority, application Germany, June 6, 1964, F 43,108; Feb. 16, 1965, F 45,255
Int. Cl. C07c 21/04
U.S. Cl. 260—654                                    6 Claims

ABSTRACT OF THE DISCLOSURE

Method for preparing allyl chloride and monomethyl-substitution products thereof by reacting oxygen (a) with hydrogen chloride and a $C_3$–$C_4$ olefin; (b) with a $C_3$–$C_4$ monochloroparaffin; or (c) with a mixture of (a) and (b); using palladium-II-oxide as a catalyst.

---

The present invention relates to a process for preparing allyl chloride and its monomethyl-substitution products.

It is known to react olefins directly with chlorine to yield olefins in which one or several carbon atoms directly adjacent the carbon atoms of the double bond each carry a chlorine atom. Propylene, for example, reacts with chlorine at high temperature and with a short residence time to 3-chloro-propene-(1) (allyl chloride). When butene-(2) is used, the chlorination reaction takes place at lower temperature and leads to the formation of 1-chloro-butene-(2) (crotyl chloride). Isobutene can be transformed at low temperatures and under the action of chlorine into 3-chloro-2-methyl-propene-(1) (methallyl chloride).

In the aforesaid chlorination processes, some of which are carried out on an industrial scale, such as the high temperature chlorination of propylene, one mol of chlorine ($Cl_2$) is used for one mol of olefin. Only one half of the chlorine is used up for the formation of the allyl chloride, while the other half forms hydrogen chloride as by-product. As in many chlorination processes, in this case, too, the economy of the process is impaired by the formation of hydrogen chloride.

A process for transforming an olefin into the corresponding allylicyl unsatuarted chloride, avoiding the formation of hydrogen chloride and permitting the use of commercially available hydrogen chloride and oxygen as chlorination agents, would represent considerable industrial progress.

It has now been found that allyl chloride and monomethyl-substituted allyl chloride can advantageously be prepared by passing oxygen and (a) mixtures of olefins with 3 or 4 carbon atoms and hydrogen chloride or (b) monochloroparaffins with 3 or 4 carbon atoms or (c) mixtures of (a) and (b) over a catalyst containing palladium-II-oxide.

Using olefins having one methyl group in α-position, the reaction of the olefin with oxygen and hydrogen chloride leads practically exclusively to the formation of the corresponding allylicly unsaturated chloride. Propylene and butene-(1) yield practically exclusively ally chloride and 3-chloro-butene-(1), respectively. When olefins are used having two α-methyl groups, dichloro-olefins are obtained in addition to the corresponding methyl-substituted allyl chlorides. From butene-(2) and isobutene, 1-chloro-butene-(2) (crotyl chloride) and 3-chloro-2-methylprop-ene-(1) (methallyl chloride) are respectively obtained as principal products, and 1,4-dichlorobutene-(2) and 1,3-dichloro-2-methylene-propane, respectively, are obtained as by-products. The reaction is especially smooth with propylene and isobutylene. Therefore, these olefins are preferred as starting products.

When a monochloroparaffin is reacted with oxygen, allyl chloride (3-chloro-propylene-(1)) is obtained from 2-chloropropane (isopropyl chloride) and 1-chloropropane (n-propyl chloride). Using 2 - chloro-2-methyl-propane (tert. butyl chloride) and 1-chloro-2-methylpropane (isobutyl chloride), the reaction furnishes methallyl chloride (3 - chloro-2-methyl-propylene-(1)). With the use of 2-chloro-butane (sec. butyl chloride) and 1-chlorobutane (n-butyl chloride), a small amount of crotyl chloride (1-chlorobutene-(2)) and 3-chlorobutene-(1) is obtained. In all cases the stoichiometric amounts of water are formed.

The secondary and tertiary monochloroparaffins (isopropyl chloride, tert.butyl chloride, sec.butyl chloride) are more readily oxidized, i.e. under milder conditions, to give the corresponding allylicly unsaturated chlorides (allyl chloride, methallyl choride, croty chloride), than are the primary monochoroparaffins (n-propyl chloride, isobutyl chloride, n-butyl chloride). It is remarkable that isopropyl chloride reacts more readily than sec-butyl chloride, although both compounds contain the chlorine atom in secondary position, and that isopropyl chloride and tert. butyl chloride have about the same reactivity, although in the former compound the chlorine atom is a secondary one while in the latter compound it is a tertiary one.

Hence it follows that when monochloroparaffins are used as starting materials, isopropyl chloride and tert.butyl chloride especially react smoothly to yield allyl chloride and methallyl chloride, respectively. Therefore, the two former compounds are preferred as starting products and the two latter compounds as reaction products.

It is advantageous to support the palladium-II-oxide on carrier materials, for example aluminum oxide, aluminum silicate, silica gel, pumice, asbestos, feldspar, zeolite or silicon carbide.

The system palladium-II-oxide/carrier material can be prepared in various ways. The carrier material can be impregnated with a solution of a palladium salt, preferably palladium-II-nitrate, and palladium oxide can be formed by slowly heating the impregnated catalyst in the presence of air to a temperature above 500° C. Alternatively, the system of catalyst and carrier material can be prepared by impregnating the carrier material with a solution of a palladium salt, suitably palladium-II-chloride, reducing the palladium salt with hydrogen at a temperature of about 100° C. to palladium metal, washing the catalyst with water until the wash water is free from chloride ions and transforming the elementary palladium in an oxygen current to palladium-II oxide at a temperature in the range of from 750 to 820° C. The latter method of preparing the catalyst is more complicated, but the palladium oxide is more finely and uniformly distributed on the carrier material. Still further the system of palladium-II-oxide and carrier material can be prepared by impregnating the carrier material with a solution of a palladium salt, for example the chloride, transforming the salt into the hydroxide with an alkaline substance, for example potassium hydroxide solution, and transforming the hydroxide into the oxide at a temperature above 500° C. The detection of palladium-II-oxide (PdO) on the carrier material prior to, during, and after the reaction is very simple by solution tests in nitric acid and hydrochloric acid. Elementary palladium is soluble in nitric acid, whereas palladium salts are soluble in hydrochloric acid. Palladium oxide is not dissolved by either one of these acids. The activity of the palladium-II-oxide catalyst depends on the mode of preparation and on the concentration of the palladium-II-oxide on the carrier material. It is advantageous to use catalysts containing from 1 to 40%, and more advantageously from 2 to 20%, by weight of palladium oxide, calculated on the total weight of palladium oxide and carrier material. However, allyl chloride can still be prepared with a catalyst containing less than 1% of palladium oxide or more than 40% by weight of palladium oxide. If the concentration of palladium oxide on the carrier material is too high it may be present in a coarser distribution and in a less active form.

In general, the reaction according to the invention is carried out in a manner such that the starting components, hydrogen chloride, oxygen and olefin, or oxygen and monochloroparaffin, advantageously in admixture with one another, are passed over the catalyst. When the olefin or the monochloroparaffin is liquid under the reaction conditions or dissolved in a solvent, the mixture of oxygen and hydrogen chloride, on the one hand, and the liquid olefin on the other, or the oxygen, on the one hand, and the liquid monochloroparaffin, on the other, are passed in countercurrent flow or in parallel flow over a fixed bed of catalyst, this being a mixed phase reaction. Alternatively, the reaction can be carried out in a suspension of the catalyst in a liquid. In this case, too, the catalyst may contain a carrier material. The liquid used to suspend the catalyst can be the olefin or the monochloroparaffin itself or a solution thereof in a solvent inert to the reaction.

The starting components can likewise be used in admixture with gases and liquids inert to the reaction, for example low molecular weight hydrocarbons with 1 to 6 carbon atoms, nitrogen, noble gases, carbon dioxide, or hydrogen. The oxygen required for the reaction may be used in the form of air.

Liquid starting components can be used in admixture with solvents inert to the reaction, such as chlorinated hydrocarbons, for example chloroform, and saturated hydrocarbons, for example hexane, and benzene. Although the reaction is generally carried out in the absence of water, small amounts of water do not disturb.

The temperatures and pressures to be maintained are not critical. In order to obtain high conversions it is advantageous to work at high temperatures and high pressure. However, too high a temperature favors the formation of undesired by-products, above all oxidation products, while too high a pressure favors the formation of addition products of hydrogen chloride on the olefin, for example 2-chloropropane and 1-chloropropane with the use of propylene. It is, therefore, suitable to operate at a temperature in the range of from 20 to 350° C. and preferably 50 to 300° C. and under a pressure in the range of from 0.2 to 20 atmospheres, preferably 1 to 10 atmospheres. However, the reaction takes place outside of the aforesaid ranges.

More particularly, the reaction is carried out in a manner such that a gas mixture containing the reaction components is passed through a tube filled with the catalyst, the gas mixture is condensed at the end of the reaction tube, the unreacted or formed monochloroparaffin is separated from the condensate and reconducted in whole or in part into the reaction tube together with the uncondensed portion of the reaction gas. In the preferred case of the preparation of allyl chloride from propylene or isopropyl chloride or of methallyl chloride from isobutylene or tert. butyl chloride, it is advantageous to cool the gas mixture at the end of the reaction zone to a temperature above the boiling point of the monochloroparaffin but below the boiling point of allyl chloride or methallyl chloride, respectively. Performing this partial condensation saves the costs involved in the condensation and vaporization of the unreacted or newly formed monochloroparaffin to be reconducted into the reaction zone.

It is advantageous but not necessary to select such a temperature and pressure that the monochloroparaffin is present in the gaseous state.

The reaction products are processed in the usual manner. After leaving the reaction zone, the reaction mixture is cooled, whereby the allyl chloride or its methyl-substitution product and the unreacted or newly formed monochloroparaffin are condensed. The condensate is preferably separated by distillation. In some cases, as already pointed out above, a partial condensation may be performed whereby the allyl chloride is separated from the monochloroparaffin, which is then reconducted into the reaction zone.

Whether the olefin, hydrogen chloride, and oxygen, or the monochloroparaffin and oxygen reactants can be used in stoichiometric amounts depends on the explosion limits of the oxygenated gas mixtures prior to entering the reaction zone, in the reaction zone, and after leaving the reaction zone. In general, oxygen is used in an amount below the stoichiometric amount. The molar ratio of monochloroparaffin to oxygen is advantageously in the range of from 5 to 1, more advantageously 4 to 2. However, a ratio outside these limits may also be used. When an olefin, hydrogen chloride and oxygen are used as starting components, it is suitable to choose the molar amounts of the olefin and hydrogen chloride to be not too different, for example in the range of from 1:5 and 5:1, while the oxygen can be used in deficiency or in excess.

The process according to the invention differs from the known processes for the preparation of allyl chloride and its methyl-substitution products in that the olefin is reacted with hydrogen chloride and oxygen instead of with chlorine. Since the monochloroparaffins, especially the preferred isopropyl chloride and tert. butylchloride, are produced industrially from olefins and hydrogen chloride, in that variant of the process using monochloroparaffins and reacting them to obtain allyl chloride and its methyl-substitution products, chlorine is also effectively replaced by hydrogen chloride and oxygen.

The following examples serve to illustrate the invention but they are not intended to limit it thereto, the percentages are by volume unless otherwise stated.

EXAMPLE 1

200 milliliters of pumice grains were impregnated with a solution of 18 grams of palladium-II-chloride in aqueous hydrochloric acid. The impregnated material was treated with hydrogen for 8 hours at 100° C., whereby the palladium salt was reduced to elementary palladium. The catalyst was thoroughly washed with water and dried. It was then treated with oxygen for 8 hours at 800° C., whereby the palladium was oxidized to palladium-II-oxide.

The catalyst obtained was filled in a tube, the tube was heated in a gas furnace at 250° C. and at atmospheric pressure 30 liters measured at 0° C. and at 760 mm. Hg of a gas mixture consisting of 60% of propylene, 20% of oxygen and 20% of hydrogen chloride was passed over the catalyst per hour at atmospheric pressure. The issuing gas mixture contained, in addition to unreacted starting components, 3% of allyl chloride, 0.8% of 2-chloropropane, 0.05% of 1-chloropropane and 0.08% of carbon dioxide.

EXAMPLE 2

100 grams of aluminum silicate in the form of balls having a diameter of 5 millimeters were impregnated with 8.5 grams of palladium-II-chloride. The material was treated with hydrogen at 95° C., whereby the palladium salt was reduced to the metal, and then oxidized with oxygen at 800° C., whereby the metal was transformed into the oxide (PdO).

The catalyst was filled into a glass tube having an internal diameter of 12 mm. and was placed into an electric furnace. At 215° C. and atmospheric pressure a gas current containing 73% of vaporized 2-chloro-propane and 27% of oxygen was passed through the tube. The issuing gas mixture was cooled. A condensate was obtained containing allyl chloride, in addition to unreacted 2-chloro-propane.

With the use of 12 liters per hour of a gas mixture, measured at 18° C. and under a superatmospheric pressure of 0.03 atmosphere, about 1 gram of allyl chloride was obtained per hour.

We claim:

1. A process for preparing allyl chloride or its monomethyl-substitution products, respectively, which process comprises conducting oxygen and a secondary or tertiary monochloroparaffin having 3 to 4 carbon atoms, respectively, over palladium-II-oxide as a catalyst at a temperature of from 50° C. to 350° C. and at a pressure of from 0.2 to 20 atmospheres.

2. A process as in claim 1 wherein said catalyst is supported on a carrier.

3. A process as in claim 1 wherein the reaction temperature is from 50° C. to 300° C.

4. A process as in claim 1 wherein the reaction pressure is from 1 to 10 atmospheres.

5. A process as in claim 1 wherein isopropyl chloride is reacted.

6. A process as in claim 1 wherein tert.-butyl chloride is reacted.

References Cited

UNITED STATES PATENTS

| 2,838,577 | 6/1958 | Cook et al. | 260—656 |
| 2,951,103 | 8/1960 | Ellsworth et al. | |
| 3,267,161 | 8/1966 | Ukaji et al. | |

FOREIGN PATENTS

| 671,130 | 9/1963 | Canada. |
| 633,643 | 12/1963 | Belgium. |

LEON ZITVER, Primary Examiner

J. BOSKA, Assistant Examiner

U.S. Cl. X.R.

260—619